US 6,636,917 B1

(12) United States Patent
Linares et al.

(10) Patent No.: US 6,636,917 B1
(45) Date of Patent: Oct. 21, 2003

(54) CARD DESIGN HAVING TAPE AND DISK DRIVES

(75) Inventors: Ignacio Linares, Plano, TX (US); Serge Fourcand, Fairview, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/539,759

(22) Filed: Mar. 31, 2000

(51) Int. Cl.$^7$ .............................................. G06F 13/00
(52) U.S. Cl. ..................................... 710/300; 710/301
(58) Field of Search ................................ 710/300, 301, 710/302, 305; 711/112; 361/736, 742, 758; 709/200

(56) References Cited

U.S. PATENT DOCUMENTS

| | | | | |
|---|---|---|---|---|
| 5,515,515 A | * | 5/1996 | Kennedy et al. ............. | 710/302 |
| 6,000,020 A | * | 12/1999 | Chin et al. .................... | 370/401 |
| 6,014,319 A | * | 1/2000 | Kuchta et al. ................. | 307/43 |
| 6,112,276 A | * | 8/2000 | Hunt et al. ................... | 711/112 |
| 6,282,599 B1 | * | 8/2001 | Gallick et al. ............... | 710/306 |
| 6,289,376 B1 | * | 9/2001 | Taylor et al. ................ | 709/203 |
| 6,293,636 B1 | * | 9/2001 | Le et al. ............. | 292/DIG. 37 |
| 6,389,499 B1 | * | 5/2002 | Frank et al. ................. | 361/685 |

OTHER PUBLICATIONS

Force Computers, "Compact vs. Industrial PC's", Jan. 1997, pp. 1–19.
Fischer, Wayne, "Compact PCI—Next–Generation Bus Architecture", Feb. 1998, pp. 106–109.
PCI Industrial Computers, "CompactPCI Specification", Oct. 1999, pp. 9–61.

* cited by examiner

Primary Examiner—Xuan M. Thai
(74) Attorney, Agent, or Firm—Danamraj & Youst, PC; Craig A. Hoersten; V. Lawrence Sewell

(57) ABSTRACT

A storage card module having a front panel card component and a rear panel transition module disposed on a backplane in accordance with the Compact Peripheral Component Interconnect (CPCI) bus standard, wherein the front panel card component is provided with at least one Small Computer System Interface (SCSI) storage medium drive. Power is supplied to the SCSI drive from a CPCI bus connector on the backplane, whereas a user-defined I/O connector on the backplane provides interconnection between the drive and the SCSI bus that is coupled to an I/O controller via an interface formed on the real panel transition module. Bus cabling coupled via the user-defined I/O connector may be used to daisy-chain other SCSI-based cards, mass storage devices, or may be terminated. A power cable deriving power from the CPCI bus connector provides auxiliary power output via a rear panel power connector to such daisy-chained mass storage devices.

17 Claims, 6 Drawing Sheets

CARD DESIGN HAVING TAPE AND DISK DRIVES

CROSS-REFERENCE TO RELATED APPLICATIONS

This application discloses subject matter related to the subject matter disclosed in the following co-assigned patent applications; (1) "Method and Apparatus for Routing Alarm Signals in a Signaling Server," filed Mar. 31, 2000, Ser. No. 09/540,308, in the name(s) of: Val Teodorescu; (2) "Bus Control Module with System Slot Functionality in a Compact Peripheral Component Interconnect Bus System," filed Mar. 31, 2000, Ser. No. 09/540,594, in the name(s) of: Serge Fourcand, Curt McKinley, and Val Teodorescu; (3) "Clock Distribution Scheme in a Signaling Server," filed Mar. 31, 2000, Ser. No. 09/541,002, in the name(s) of: Val Teodorescu; (4) "Bus Control Module for a Multi-Stage Clock Distribution Scheme in a Signaling Server," filed Mar. 31, 2000, Ser. No. 09/540,591, in the name(s) of: Serge Fourcand, Curt McKinley, and Val Teodorescu; and (5) "Multiple Staggered Low Profile Connectorization for Providing SCSI Drives on a CPCI Card," filed Mar. 31, 2000, Ser. No. 09/541,471, in the name(s) of: Ed Bradley, Melvin (Jack) G. Peel, Hadi Hayek, and Ignacio Linares.

BACKGROUND OF THE INVENTION

1. Technical Field of the Invention

The present invention relates to modularized storage cards coupled to backplanes and, more particularly, to a card design having plural types of storage drives for use in a network element (e.g., a Next Generation Signaling Transfer Point (STP)) disposed in a Signaling System No. 7 (SS7) network.

2. Description of Related Art

The exponential increase in the number of local telephone lines, mobile subscribers, pages, fax machines, and other data devices, e.g., computers, Information Appliances, etc., coupled with deregulation that is occurring worldwide today is driving demand for small form factor, high capacity STPs which must be easy to maintain, provide full SS7 functionality with so-called "five nines" operational availability (i.e., 99.999% uptime), and provide the capability to support future functionality or features as the need arises. Further, as subscriber demand for more service options proliferates, an evolution is taking place in the telecommunications industry to integrate Intelligent Network (IN)-capable Service Control Point (SCP) functionality within STP nodes.

While it is generally expected that a single platform that supports large-database, high-transaction IN services as well as high-capacity packet switching (hereinafter referred to as a signaling server platform) will reduce equipment costs, reduce network facility costs and other associated costs while increasing economic efficiency, those skilled in the art should readily recognize that several difficulties must be overcome in order to integrate the requisite functionalities into a suitable network element that satisfies the stringent performance criteria required of telecommunications equipment. Daunting challenges arise in designing a compact enough form factor that is efficiently scalable, ruggedized, and modularized for easy maintenance, yet must house an extraordinary constellation of complex electronic circuitry, e.g., processors, control components, timing modules, I/O, line interface cards which couple to telephony networks, etc., that is typically required for achieving the necessary network element functionality. Whereas the electronic components may themselves be miniaturized and modularized into cards or boards, interconnecting a large number of such cards via suitable bus systems and controlling such interconnected systems poses many obstacles.

It should be apparent to those skilled in the art that the aforementioned concerns are particularly exacerbated when it is required that I/O interfaces to storage devices be configurable such that different storage media may be provided on "as-needed" basis using the same interface and form factor associated therewith. Further, when such configurable yet standardized I/O interfaces are also required to support hot-swappability, additional complications arise.

Conventional bus backplane arrangements for supporting I/O interfaces are beset with numerous deficiencies and drawbacks in this regard. In the existing solutions, for example, the bus slot that is to receive a storage I/O card is hardwired to accept only that particular type of storage device and typically will not work with other storage devices without extensive modifications which may include both electrical and mechanical aspects. That is, a bus slot designed for a tape drive card will not accept a disk drive card and vice versa.

Moreover, if it is required for some reason that a storage bus slot be used not for storage cards but for some other functionality, e.g., processing element functionality, the existing backplanes cannot accommodate such requirements. Thus, once a bus slot is formed for a particular purpose and device, there is very little that can be done with the arrangement if future needs require replacement or a change in the use of the slot. Consequently, adaptability of a system having such conventional bus slot arrangements is severely impacted.

SUMMARY OF THE INVENTION

Accordingly, the present invention is directed in one aspect to a modularized storage card apparatus that comprises a backplane having a front side and a rear side, wherein the backplane conforms to the Compact Peripheral Component Interconnect (CPCI) bus standard. The front and rear sides are provided with slots that include a CPCI bus connector and a user-defined connector. A rear panel module is coupled to the rear side of the backplane via the CPCI bus and user-defined connectors, wherein the rear panel module is provided with a first input/output (I/O) bus interface and a second I/O bus interface. The first I/O bus interface effectuates a coupling with an I/O bus controller, whereas second I/O bus interface may be coupled to other storage devices or may be terminated. A front panel card is coupled to the front side of the backplane via the CPCI bus and user-defined connectors, wherein the front panel card is provided with at least one storage drive formed thereon. The storage drives may comprise disk drives, tape drives, or a combination, and receive power from the CPCI bus connector. An electrical conductive path between the storage drives and the first I/O bus interface is effectuated via the user-defined connectors of the backplane. In a presently preferred exemplary embodiment of the present invention, Small Computer System Interface (SCSI) devices, e.g., SCSI tape and disk drives, etc., are particularly exemplified.

In another aspect, the present invention relates to a system manager shelf for use in a signaling server disposed in a telecommunications network. The system manager shelf comprises a backplane having a plurality of slots formed on its front and rear sides. A storage card having a first storage drive and a second storage drive formed thereon occupies at least one of the slots on the front side of the backplane. A processor card controlling the storage card occupies another slot on the front side of the backplane. The processor card and the storage card electrically communicate via respective transition modules associated therewith which are disposed on the rear side of the backplane.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
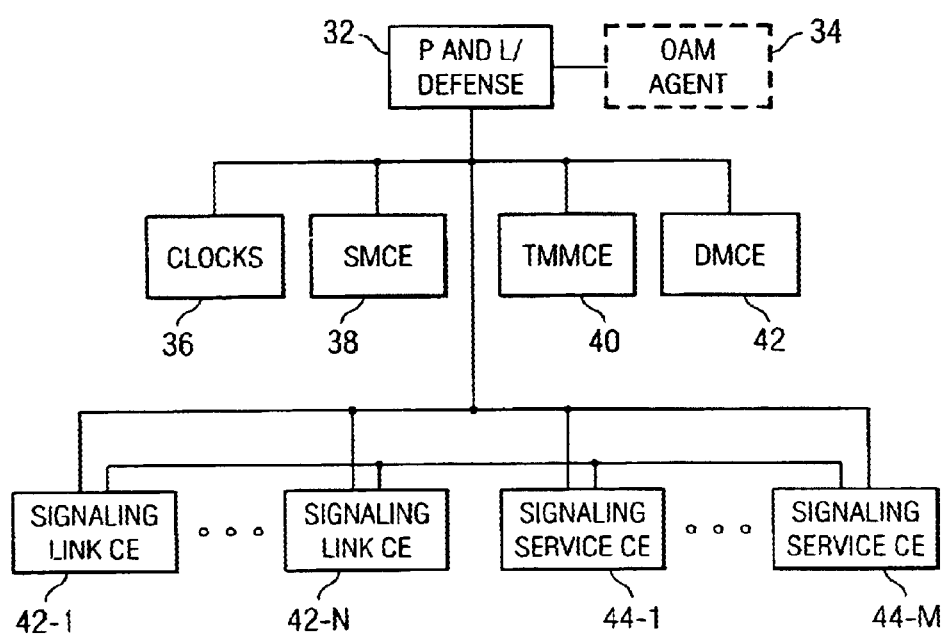
FIG. 1 depicts a high-level a functional block diagram of an exemplary embodiment of a signaling server wherein a storage card module provided in accordance with the teachings of the present invention may be advantageously deployed.

In the drawings, like or similar elements are designated with identical reference numerals throughout the several views thereof, and the various elements depicted are not necessarily drawn to scale. Referring now to FIG. 1, depicted therein is a high-level functional view of an exemplary telecommunications network node disposed in a heterogeneous network environment, e.g., a signaling server having enhanced STP functionality, wherein a storage card module provided in accordance with the teachings of the present invention may be advantageously utilized. The signaling server is preferably based on a distributed architecture of loosely coupled computing/control elements (CEs) or processors networked together via a high-speed Ethernet switching fabric. Each processor performs discrete functions in the control and maintenance of particular devices and in the control of signaling, administrative, and/or maintenance functions. The plurality of CEs of the signaling server may preferably be grouped together based on their functionality as follows: Peripheral and Load CEs (PLCE) 32 coupled to an Operations, Administration and Maintenance (OAM) Agent 34 which is responsible for performing Operation Support System (OSS) interfaces; Signaling Management CEs (SMCE) 38; Database Management CEs (DMCE) 42; Traffic Metering and Measurement CEs (TMMCE) 40; and, depending upon the number of network link interfaces and their type (e.g., DS-0A, T1, E1, etc.), a plurality of Signaling Link CEs (SLCE) 42-1 through 42-N and a plurality of Signaling Service CEs (SSCE) 44-1 through 44-M. A plurality of clocks 36 are also provided under the control of PLCE 32 for furnishing the various time base signals required for the operation of the signaling server.

The PLCE 32 is provided as the logical master CE of the signaling server and controls all its vital function such as, e.g., system initialization and loading, command handlers, centralized configuration management, centralized fault handling and test management, alarm handling and clock management, etc. The OAM Agent 34 operates in conjunction with the PLCE 32 as a co-master of the signaling server system and shares the OAM functionality therewith. The OAM Agent 34 is responsible for providing user interfaces (preferably Web-based graphic user interfaces) and includes local service management, reset controller management, No. 2 Switching Control Center System (SCCS) functionality, and Signaling Engineering and Administration System (SEAS) functionality.

Continuing to refer to FIG. 1, the TMMCE 40 contains a centralized collection mechanism for all measurements data collected in the signaling server system. The SMCE 38 manages the SS7 subsystem which comprises the following: SS7 route management; SS7 traffic management; SS7 provisioning; and Signaling Connection Control Part (SCCP) management. Each SLCE (e.g., reference numeral 42-1) controls SS7 link hardware and contains up to and through Message Transfer Part (MTP) Level 3 and SCCP functionality. The SLCE is responsible, accordingly, for the following: MTP Levels 2 and 3; SS7 link management; SCCP with Global Title Translation (GTT); and gateway screening.

The SSCE (e.g., SSCE 44-1), which controls no SS7-related hardware, contains logical database and screening service functionality for the SS7 subsystem. Its functionality includes: Local Number Portability (LNP) services; SCCP with GTT; gateway screening; and MTP buffering and routing. The DMCE 42 also controls no SS7-related hardware and provides the LNP and Application Location Register (ALR) functionality for the SSCEs.

Figure 2:
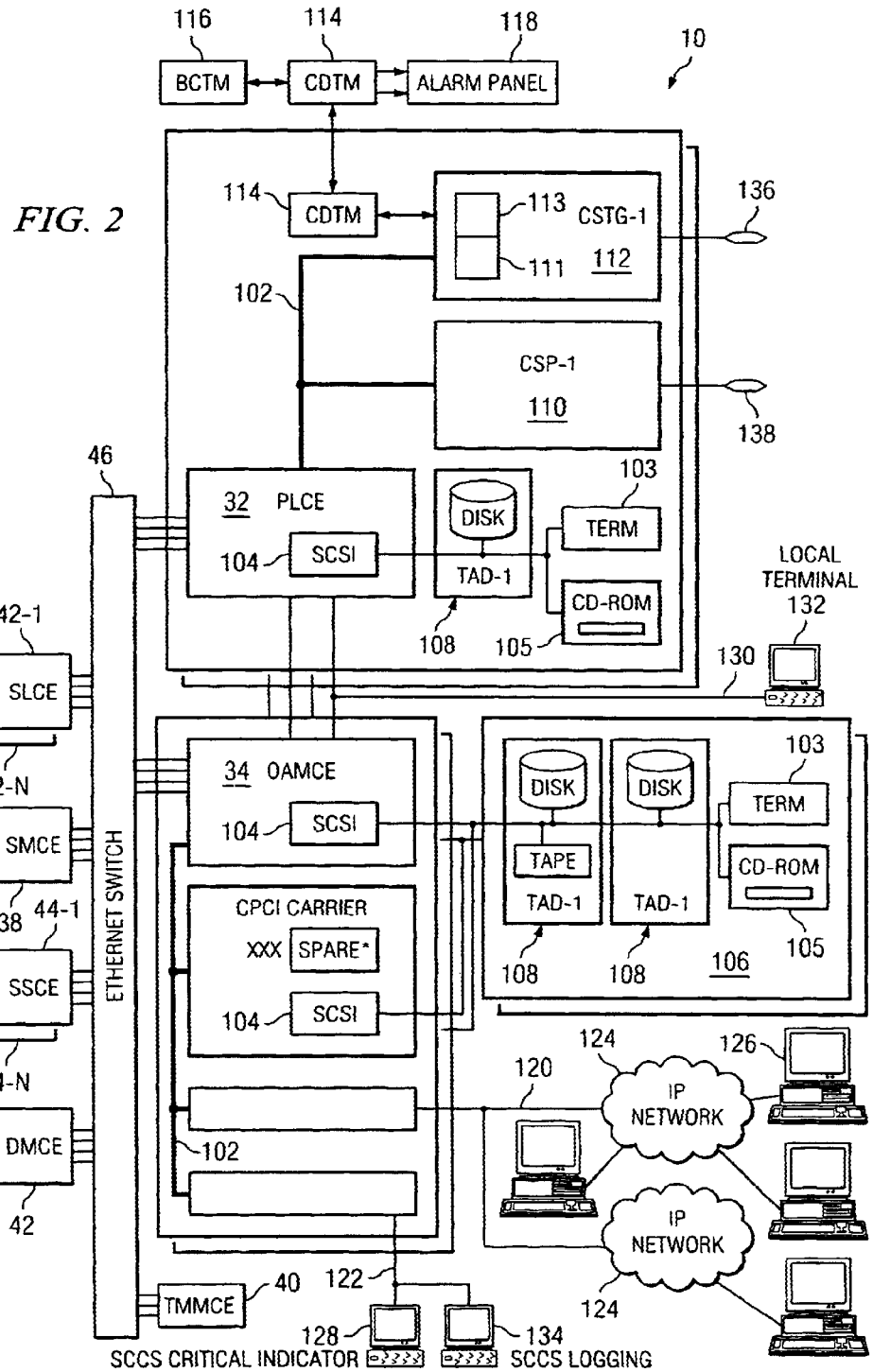
FIG. 2 depicts a hardware architectural block diagram of a presently preferred exemplary signaling server including a storage card module of the present invention.

FIG. 2 depicts a hardware architectural block diagram of a presently preferred exemplary embodiment of a signaling server 10 which includes a storage card module provided in accordance with the teachings of the present invention. The signaling server's CE components such as SLCE 42-1 through 42-N, SMCE 38, SSCE 44-1 through 44-M, TMMCE 40, OAMCE 34, PLCE 32, and DMCE 42 are connected to a redundancy-based Ethernet switching fabric (ESWT) 46. A plurality of computers, e.g., PC 126, are coupled to the OAMCE 34 via a suitable IP network 124 and IP-compatible path 120 for providing Web-based user interfacing with the signaling server with respect to the SEAS and SCCS functionality. Similarly, SCCS terminals 128 and 134 are coupled to the OAMCE 34 via an RS-232 path 122.

One or more Small Computer System Interface (SCSI) controller modules 104 are included in the OAMCE block 34 for preferably providing cross-coupled interface connectivity (i.e., via a redundant SCSI controller module) to a plurality of storage I/O card modules 106 having tape and disk (TAD) module 108, a Compact Disc Read-Only Memory (CDROM) drive 105, and a suitable SCSI termination 103. Advantageous provision of the TAD modules in accordance with the teachings of the present invention is set forth in greater detail hereinbelow.

A SCSI controller 104 is also included in the PLCE block 32 for providing cross-coupled interface connectivity to a TAD module 108 associated therewith. A Control and Sense Point (CSP) 110 is coupled to the PLCE component 32 for providing the capability to receive and process customer alarm control points and alarm sense points via interface 138. A system timing generator (STG) module 112 having a clock 113 of a particular Stratum stability standard and an on-board computer (OBC) 111 is coupled to the PLCE component 32 and is provided with an external clock interface 136. The STG module 112 forms the first stage of the signaling server's multi-stage clock/alarm distribution system which includes one or more clock distribution modules (CDMs) 114 and bus control modules (BCMs) coupled thereto, wherein the STG controls the operation of the CDMs and BCMs by sending out a framed serial control signal called Super Frame Indicator (SFI) signal. Additional details regarding the distributed architecture of the signaling server and its multi-stage clock/alarm distribution system are provided in the co-pending commonly assigned U.S. patent applications which have cross-referenced hereinabove and are incorporated by reference herein.

Those skilled in the art should realize upon reference hereto that the various CE blocks and associated storage devices described hereinabove may be advantageously provided as highly modularized Printed Board Assemblies (PBAs) disposed on a suitably segmented high performance bus system that affords a rugged mechanical form factor in addition to hot swappability in order to increase system reliability and availability. Accordingly, the well known Compact Peripheral Component Interconnect (CPCI) standard which has emerged as the bus system of choice for ruggedized applications requiring stringent form factors while still maintaining electrical compatibility with the PCI bus standard in terms of its high performance is preferably utilized for interconnecting the various PBAs of the signaling server. As those skilled in the art should readily recognize, although the CPCI standard is identical to the PCI standard used in PCs in terms of electrical performance, it offers a more connectorized card form factor and uses a vertically mounted backplane that is not only highly robust, but also provides access from both sides of the backplane. Typically, a card module's functional elements are provided on its front panel portion, allowing all cabling associated the particular card module to be provided as a rear side interface using a rear panel board known as a transition module (TM). Also, in typical usage, a TM is connected to its front panel card component via a mirror image of the connector interface through the backplane.

Furthermore, the vertical layout of the backplane provides for better cooling in the backplane chassis, an essential consideration in heat intensive applications, in addition to facilitating the mechanical aspects of live insertion/removal of cards quickly and efficiently (i.e., hot swappable).

Still continuing to refer to FIG. 2, a CPCI bus segment 102 is therefore preferably provided as the interconnect means between the various components of the OAMCE block 34 and between the PLCE 32 and STG 112. Because the various hardware components of the signaling server are preferably provided as CPCI-compatible boards or cards, their nomenclature may be suitably modified to reflect this condition. For example, the STG 112 may be interchangeably referred to as CPCI STG or CSTG hereinafter. Moreover, as the CPCI standard allows for efficient connecterization utilizing both the front and back of a backplane to attach multiple components, the CDMs and BCMs of the clock distribution scheme are preferably provided as the rear panel TMs without any associated front panel cards. Accordingly, hereinafter, the CDM 114 may be interchangeably referred to as Clock Distribution Transition Module (CDTM) and the BCM 116 as Bus Control Transition Module (BCTM).

It should be apparent to those skilled in the art that the signaling server's size is typically contingent upon the number of telecommunications network links it is designed to service in addition to the volume/type of signaling loads received thereat. Accordingly, the hardware architecture of the signaling server 10 is preferably provided to be scalable and redundant. Furthermore, the housing frame of the signaling server which is highly modularized for easy maintenance is amenable to clustering several basic housing units in inter-connected groups operating together as a single signaling server node.

Figure 3A:
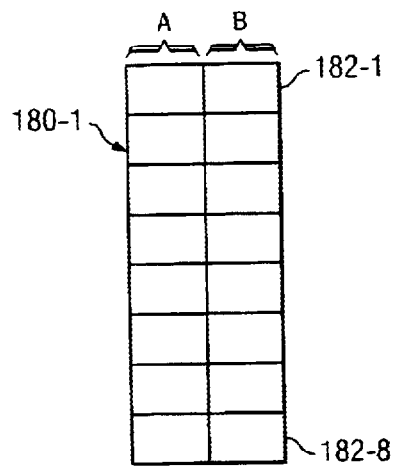
FIGS. 3A–3C depict three exemplary configurations of the signaling server depending upon its size.
Figure 3B:
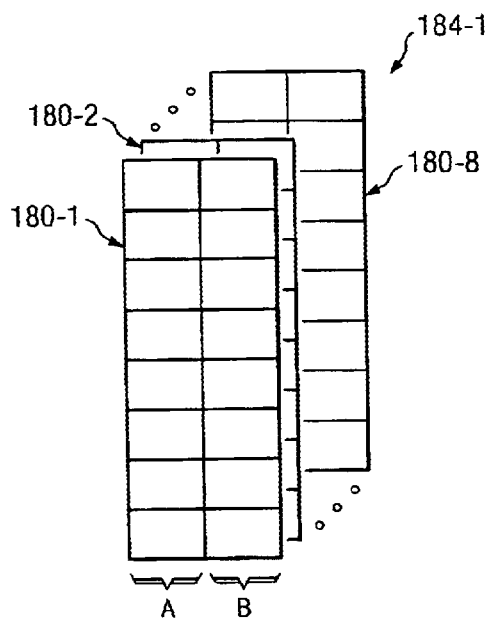
Figure 3C:
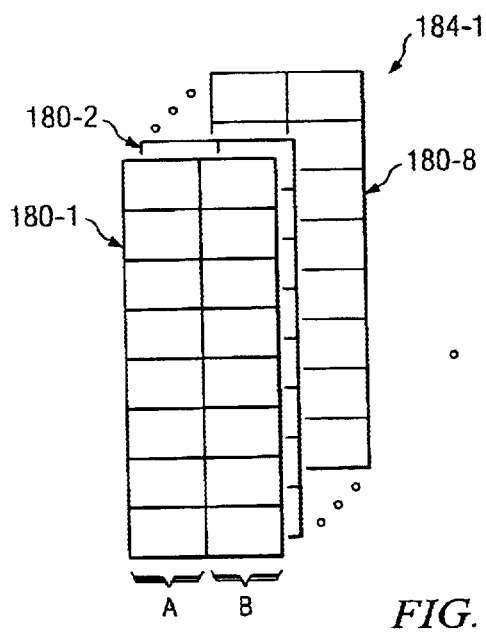
Figure 3C:
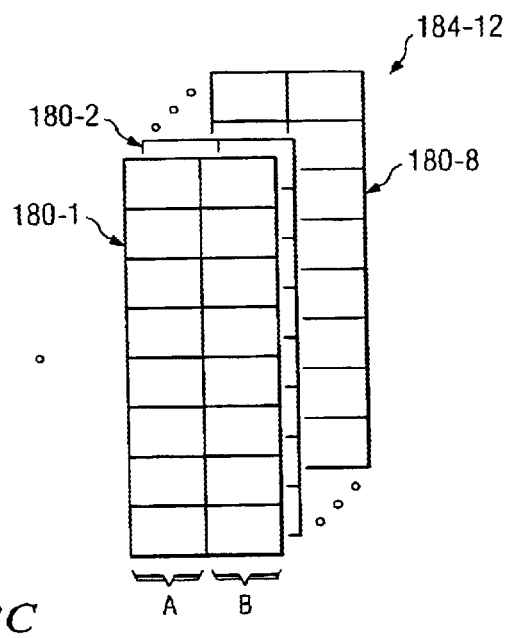

FIGS. 3A–3C depict three exemplary hierarchical levels of clustering used for expanding the signaling server's capacity. A single rack 180-1 illustrated in FIG. 3A exemplifies the basic housing frame design of the signaling server. The rack 180-1 is preferably compartmentalized into a plurality of sub-racks or shelves that house various CE components (hereinafter also referred to as CPCI CE components or CPCEs), line/link interface modules (LIMs) such as, e.g., DS-0A interface modules (DIMs), clock distribution components, and numerous associated devices and units, e.g., Power Supply Units (PSUs), fans, storage (e.g., TAD) boards, etc., all in modularized PBAs disposed on CPCI backplane connectors. In a presently preferred exemplary rack embodiment, eight shelves/sub-racks are provided which are labeled with reference numerals 182-1 through 182-8. In addition, it is envisaged that the signaling server functionality and associated hardware is partitioned among the various shelves such that some of the shelves may have specialized roles. For example, the administrative functionality of the signaling server may be conveniently packaged in the top shelf of the rack and accordingly may be referred to as the administration (ADMIN) or system manager (SYSMAN) shelf. In similar fashion, shelves dedicated to providing the link interface functionality may be referred to as link shelves.

Further, each shelf of the rack 180-1 is segregated into an A-side and a B-side (referred to as half-shelves) to house redundant portions of the allocated hardware in order to increase reliability and interoperability of the system. Each half-shelf contains a CPCI backplane which preferably provides eight 6U/4HP (horizontal pitch) slots fully connectorized through J1 through J5 connectors on the front side as well as the rear panel TM side. A single BCM (or BCTM) card is provided in each half-shelf for distributing the clock signals to the PBAs disposed in the backplane slots. A single pair of CDTM cards which are connected to a pair of CSTGs are provided in the leading shelf (i.e., ADMIN shelf) of the rack 180-1 to provide the clock signals to the eight pairs of the BCTM cards.

Additional hierarchical configurations are shown in FIGS. 3B and 3C. In particular, a multi-rack configuration or cluster 184-1 is depicted in FIG. 3B. Preferably, the cluster 184-1 comprises eight racks, labeled with reference numerals 180-1 through 180-8, each of which is compartmentalized into A- and B-sides as set forth above with reference to rack 180-1. FIG. 3C depicts a multi-cluster, multi-rack configuration of the signaling server which utilizes up to twelve clusters (reference numerals 184-1 through 184-12) of eight racks each.

Figure 4A:
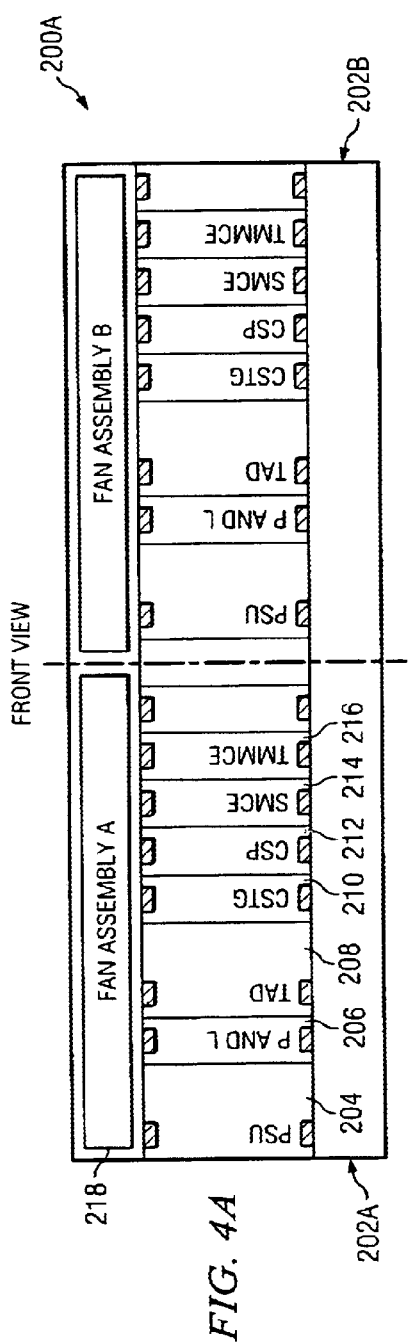
FIG. 4A depicts a front view of an administrator or system manager shelf of the signaling server which exemplifies the location of the storage card module with respect to a Compact Peripheral Component Interconnect (CPCI) backplane.
Figure 4B:
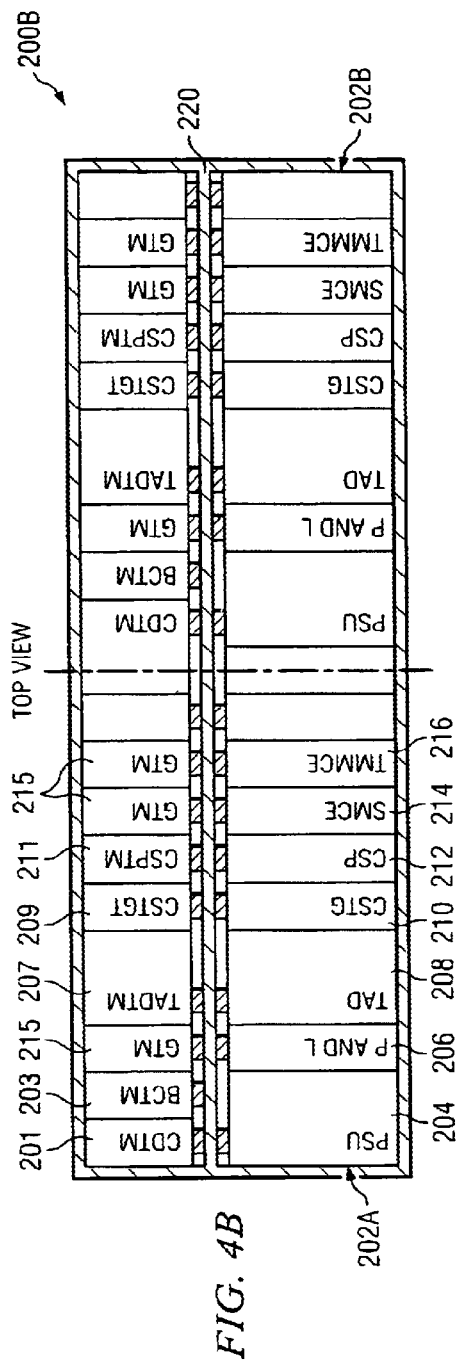
FIG. 4B depicts a top view of the administrator or system manager shelf exemplifying front side panel and rear side panel components of the storage card module on the CPCI backplane.

Referring now to FIGS. 4A and 4B, two views of an exemplary ADMIN shelf are depicted. Reference numeral 200A refers to a front view of the exemplary ADMIN shelf wherein the placement of a TAD module is illustrated. Reference numerals 202A and 202B exemplify two half shelves of the ADMIN shelf. As pointed out in the foregoing, the half shelves house the redundant hardware components and, accordingly, only one of the half shelves is described in greater detail.

The front panel view 200A of the ADMIN shelf shows a PSU 204, a PLCE card 206, a TAD card 206, a CSTG card 210, a CSP card 212, an SMCE card 214, and a TMMCE card 216. A fan assembly 218A for the half shelf 202A is positioned above the card assembly disposed therein.

Reference numeral 200B in FIG. 4B refers to a top view of the exemplary ADMIN shelf wherein a CPCI backplane 220 to which the various cards, both front panel or front side card components and rear panel or rear side transition modules, are coupled. Behind the PSU 204, the clock/alarm distribution stages CDTM 201 and BCTM 203 are provided on the rear side of the backplane 220. The CSTG card 210 is provided with a corresponding TM 209 which provides connectivity to the CDTM stage of the multi-stage clock/alarm system of the signaling server. The CSP card 212 is provided with a corresponding CSPTM 211 on the rear side of the backplane. The various CE cards, i.e., PLCE card 206, SMCE card 214, and TMMCE 216, are similarly provided with corresponding generic transition modules (GTMs) 215 on the rear side of the backplane 220 for I/O connectivity. The TAD card 208, disposed adjacent the PLCE card 206, is provided with its rear panel TM (TADTM) 207 in similar fashion.

Figure 5:
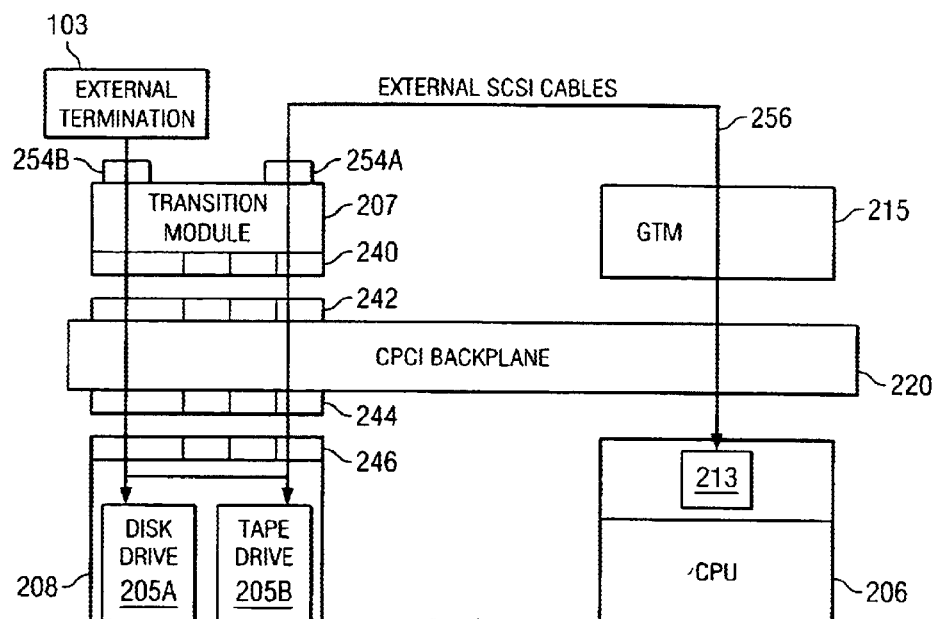
FIG. 5 illustrates an exemplary storage card module arrangement using the Small Computer System Interface (SCSI) media devices in accordance with the teachings of the present invention.

FIG. 5 depicts an exemplary storage card module using SCSI media drives, e.g., a disk drive 205A and a tape drive 205B, in accordance with the teachings of the present invention. The CPCI backplane 220 is provided with a set of front side connectors 244 and a set of rear side connectors 242 for coupling with the front panel storage card 208 and the rear side TM 207, respectively. The front panel TAD storage card 208 is provided with card connectors 246 for front side coupling. In similar fashion, the rear side TM 207 is provided with rear module connectors 240 for effectuating rear side coupling with the backplane 220.

In accordance with the teachings of the present invention, the rear panel TM 207 is also provided with interfaces for effectuating SCSI bus connectivity between the SCSI storage media disposed on the front panel storage card 208 and an external SCSI controller 213 which may operate under the control of a CPU such as, e.g., PLCE 206. Accordingly, a controller interface 254A disposed on the rear side TM 207 couples to an external SCSI bus cable 256 which extends to a GTM 215 that is associated with the front side CPU/PLCE card 206. Another interface 254B is disposed on the storage card TM 207 for coupling to the SCSI termination 103. Those skilled in the art should readily recognize upon reference hereto that the interface 254B may also be employed for coupling with another SCSI storage card via its TM (in a daisy chain fashion) or with a mass storage device such as, e.g., a disk or tape drive, or a magneto-optic disk drive (MODD), or with a cross-coupled redundant SCSI controller, before it is terminated. The SCSI controller functionality embodied in, or associated with, the CPU/CPCE 206 controls I/O operation with respect to the storage media drives 205A and 205B using the SCSI bus cabling 256 and connectorized coupling across the CPCI backplane.

Figure 6:
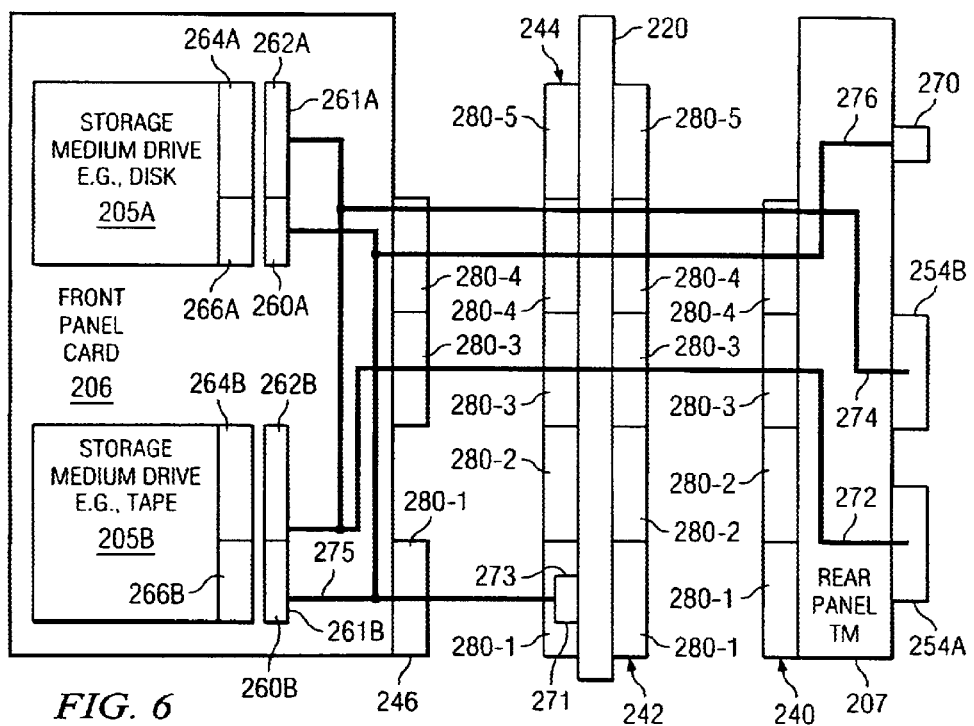
FIG. 6 depicts another view of the exemplary storage card module arrangement using the SCSI devices.

Referring now to FIG. 6, another view of the exemplary storage module arrangement using the SCSI media is shown wherein the CPCI-compliant connectorization is particularly emphasized for both the front and rear side connectors, reference numerals 244 and 242, respectively, disposed on the backplane 220, in addition their respective mates on the front panel card 206 (reference numeral 246) and the rear panel TM 207 (reference numeral 240). Accordingly, the connectors disposed on each side of the backplane 220 are comprised of five individual portions, J1 through J5, reference numerals 280-1 through 280-5. Further, J1–J4 mate portions are illustratively provided as the front panel card and rear panel TM connectors in this presently preferred exemplary embodiment.

In accordance with the teachings of the present invention, a cable connector (reference numerals 261A and 261B) that is comprised of a power connector portion and a SCSI connector portion is associated with each storage device on the front panel card 206. For example, the cable connector 261A associated with the disk drive 205A comprises the power connector portion 260A and the SCSI connector portion 262A. In similar fashion, the cable connector 261B associated with the tape drive 205B comprises the power connector portion 260B and the SCSI connector portion 262B.

Furthermore, each storage drive is accordingly provided with suitable mate portions corresponding to these cable connectors associated therewith. With respect to the disk drive 205A, therefore, a mate connector portion 266A is provided to couple with the power connector portion 260A and an I/O connector portion 264A is provided for coupling with the SCSI connector portion 262A. In similar fashion, with respect to the tape drive 205B, a mate connector portion 266B is provided to couple with the power connector portion 260B and an I/O connector portion 264B is provided for coupling with the SCSI connector portion 262B.

Power is distributed in the presently preferred exemplary storage card module arrangement by establishing a power receive path 275 between power pins 271 and 273 of the J1 connector portion which forms the standard 32-bit PCI bus connector and the power connector portion 260B of the tape drive 205B. Preferably, power pin 271 provides a +5.0 VDC supply and power pin 273 provides a +12.0 VDC supply. Power is then distributed to the disk drive 205A via its power connector portion 260A and is rerouted through the J4 connector portions 280-4 as a power return path 276 which is coupled to an external power connector 270 disposed on the rear panel TM 207. As alluded to in the foregoing, the external power connector 270 of the rear panel TM 207 may be advantageously utilized for providing backplane-derived power to other mass storage devices (e.g., other storage cards or MODDs etc.).

I/O bus connectivity, i.e., SCSI bus arrangement, of the storage card module is achieved by advantageously utilizing one or more user-defined connector portions, i.e., any combination of the J3 through J5 portions, of the CPCI-compliant backplane connectors in accordance with the teachings of the present invention. Incoming SCSI bus portion 272 emanates from the SCSI controller interface 254A disposed on the rear panel TM 207 and is routed to the storage devices on the front panel card 206 via the J3 portions 280-3 of the connectors. Preferably, the SCSI bus portion 272 is connected to the devices by stubbing off the bus and coupling through a cable coupled to the SCSI connector portions 262A and 262B, respectively. The SCSI bus portion is then rerouted through one of the user-defined connector portions, e.g., the J4 portions 280-4, of the backplane connectors 242 and 244, to the rear panel TM's other bus interface 254B which may be used to couple to the next SCSI device or a termination.

The storage card arrangement of the present invention may be advantageously provided with hot-swappability, wherein a BCTM operates as a hot-swap controller by controlling a particular CPCI bus signal called BD_SEL# (# is used to indicate an active low signal) that runs to all slots on the backplane 220 through the CPCI bus connectors. The BCTM accordingly receives the storage card slot's BD_SEL# signal on a predefined I/O port wherein the signal is terminated by a weak pull-down (not shown in FIG. 6). The BCTM is provided with the capability to detect the storage card's presence in the slot when a pull-up disposed on the front panel card overrides the BCTM pull-down. The BCTM can thereafter control the power up process by driving the BD_SEL# signal low. Light emitting diodes (LEDs) may be provided on both front rear panel portions (not shown) to indicate the state of the BD_SEL# signal. In normal operation of the storage card arrangement, the BD_SEL# signal is low and the LED may be designed to turn green. When the BD_SEL# signal goes high (indicating powering down of the storage card slot), the LED may be designed to turn red. Since the BCTM drives the BD_SEL# signal low after the card's presence is detected, it cannot automatically detect the slot condition when the card is extracted. Therefore, the system preferably commands the BCTM (via the SFI signal delivered to the BCTM) to power down the storage card slot prior to card's extraction. As those skilled in the art should readily appreciate, this procedure allows the BCTM to detect when the card is re-inserted in the slot.

Figure 7A:
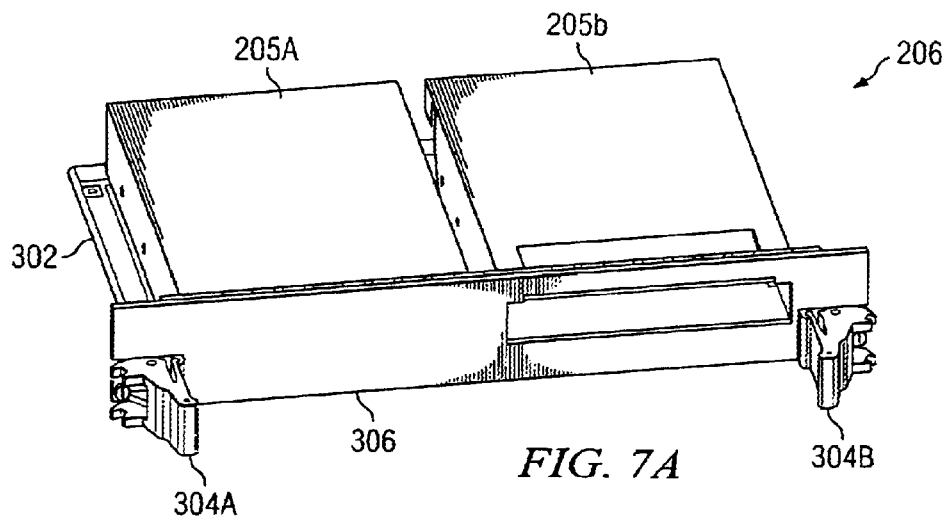
FIG. 7A depicts a perspective view of the front panel component of the presently preferred exemplary storage card module of the present invention.
Figure 7B:
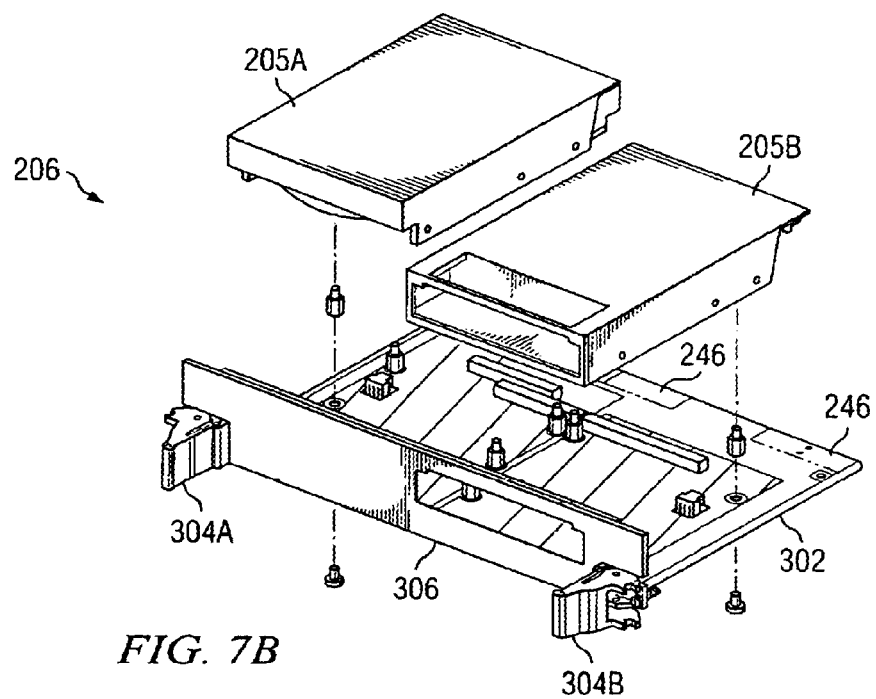
FIG. 7B depicts an exploded view of the the front panel component of the presently preferred exemplary storage card module of the present invention.

FIGS. 7A and 7B depict a perspective view and an exploded view, respectively, of the front panel card component 206 of the presently preferred exemplary embodiment of the present invention. The SCSI storage drives, reference numerals 205A and 205B, are disposed on a printed circuit board (PCB) 302 coupled to a faceplate 306 which is provided with snapping means 304A and 304B (e.g., ejector levers, clips, buckles, clasps, braces, clamps, grips, etc.) for securely holding the front panel card component 206 in place (with respect to the shelf chassis) once it is inserted in its slot on the backplane. The connectors 246 formed on the PCB 302 are particularly exemplified in the exploded view shown in FIG. 6B.

Based on the foregoing, those skilled in the art should appreciate that the present invention's storage card module arrangement advantageously overcomes the deficiencies and drawbacks found in the current I/O backplane arrangements by providing a standardized interface slot that can be used for different storage devices on "as needed" basis without extensive backplane modifications, etc. The connectorized slot can be used not only for storage cards but also for cards supporting different functionality, thereby further increasing interoperability. In addition, the present invention advantageously includes the following features: (i) maintain a continuous bus path with no more than two end points; (ii) conform to appropriate stub lengths for SCSI devices, (iii) allow the possibility of daisy-chaining other SCSI devices, and (iv) allow for termination at one of the end points of the bus.

It is believed that the operation and construction of the present invention will be apparent from the foregoing Detailed Description. While the apparatus shown and described has been characterized as being preferred, it should be readily understood that various changes and modifications could be made therein without departing from the scope of the present invention as set forth in the following claims. For example, although J3 and J4 portions of the CPCI connectors are utilized in the present invention, other combinations of the user-defined I/O connectors may also be used in accordance with the teachings of the present invention. Further, the usage of the SCSI devices, e.g., 16-bit fast-wide SCSI disk drive or 8-bit fast SCSI tape drive (for instance, a digital audio tape (DAT) drive or a quarter inch cartridge (QIC) tape drive, etc.), is illustrative rather than restrictive. Therefore, other I/O buses and storage devices compliant therewith may be provided in accordance herewith. Accordingly, all these numerous modifications, substitutions, additions, combinations, extensions, etc. are considered to be within the ambit of the present invention whose scope is limited solely by the following claims.

What is claimed is:

1. A modularized storage card apparatus, comprising:
   a backplane having a front side and a rear side, said backplane conforming to the Compact Peripheral Component Interconnect (CPCI) bus standard, each of said front and rear sides having a CPCI bus connector and a user-defined connector disposed thereon;
   a rear panel module coupled to said rear side of said backplane via said CPCI bus connector and said user-defined connector, said rear panel module having a first input/output (I/O) bus interface and a second I/O bus interface, said first I/O bus interface coupling to an I/O bus controller; and
   a front panel card coupled to said front side of said backplane via said CPCI bus connector and said user-defined connector, said front panel card having at least one storage drive formed thereon, wherein said at least one storage drive receives power from said CPCI bus connector and is coupled to said first I/O bus interface via said user-defined connector.

2. The modularized storage card apparatus as set forth in claim 1, wherein said at least one storage drive comprises a Small Computer System Interface (SCSI) tape drive, and further wherein said I/O bus controller comprises a SCSI controller.

3. The modularized storage card apparatus as set forth in claim 1, wherein said at least one storage drive comprises a SCSI disk drive, and further wherein said I/O bus controller comprises a SCSI controller.

4. The modularized storage card apparatus as set forth in claim 1, wherein said at least one storage drive comprises a SCSI Compact Disc Read-Only Memory (CDROM) drive, and further wherein said I/O bus controller comprises a SCSI controller.

5. The modularized storage card apparatus as set forth in claim 1, wherein said at least one storage drive comprises at least one of a SCSI digital audio tape (DAT) drive and a quarter inch cartridge (QIC) tape drive, and further wherein said I/O bus controller comprises a SCSI controller.

6. The modularized storage card apparatus as set forth in claim 1, wherein said second I/O bus interface is disposed in an electrical conductive relationship with said first I/O bus interface via said user-defined connector and is coupled to a bus termination point.

7. The modularized storage card apparatus as set forth in claim 1, wherein said second I/O bus interface is disposed in an electrical conductive relationship with said first I/O bus interface via said user-defined connector and is coupled to an external SCSI device.

8. The modularized storage card apparatus as set forth in claim 7, wherein said external SCSI device comprises a mass storage device selected from the group consisting of a tape drive, a fixed disk drive, a magneto-optical disk drive, and a redundant SCSI controller.

9. The modularized storage card apparatus as set forth in claim 1, wherein said rear panel module includes an external power connector for supplying power to another SCSI device, and further wherein said external power connector receives power distributed from said CPCI bus connector via a distribution path that is routed through said user-defined connector.

10. A system manager shelf for use in a signaling server disposed in a telecommunications network, comprising:
   a backplane having a plurality of slots formed on a front side and a rear side of said backplane;
   a storage card having a first storage drive and a second storage drive formed thereon, said storage card occupying one of said plurality of slots on said front side of said backplane; and
   a processor card occupying another one of said plurality of slots on said front side of said backplane, said processor card controlling said storage card,
   wherein said processor card and said storage card communicate via respective transition modules associated therewith and disposed on said rear side of said backplane.

11. The system manager shelf for use in a signaling server as set forth in claim 10, wherein said first storage drive comprises a Small Computer System Interface (SCSI) tape drive.

12. The system manager shelf for use in a signaling server as set forth in claim 11, wherein said second storage drive comprises a SCSI disk drive.

13. The system manager shelf for use in a signaling server as set forth in claim 12, wherein said transition modules are coupled using a SCSI cable.

14. The system manager shelf for use in a signaling server as set forth in claim 10, wherein said processor card comprises a Peripheral and Load Computing Element (PLCE).

15. The system manager shelf for use in a signaling server as set forth in claim 10, wherein said backplane comprises a Compact Peripheral Component Interconnect (CPCI) backplane having a CPCI bus connector portion and a user-defined I/O connector portion in each of said slots.

16. The system manager shelf for use in a signaling server as set forth in claim 10, wherein said first and second storage drives receive power from said CPCI bus connector portion.

17. The system manager shelf for use in a signaling server as set forth in claim 10, wherein said first and second storage drives are interfaced with said transition module associated with said storage card via said user-defined I/O connector portion.

* * * * *